US011562869B2

(12) United States Patent
Ikejiri et al.

(10) Patent No.: US 11,562,869 B2
(45) Date of Patent: Jan. 24, 2023

(54) RELAY UNIT

(71) Applicants: Toyota Jidosha Kabushiki Kaisha, Toyota (JP); Sumitomo Wiring Systems, Ltd., Yokkaichi (JP)

(72) Inventors: Noritaka Ikejiri, Toyota (JP); Takumi Ejima, Yokkaichi (JP); Kiyofumi Kawaguchi, Yokkaichi (JP); Maiko Oda, Yokkaichi (JP); Toshifumi Suzuki, Yokkaichi (JP); Yoshikazu Obara, Yokkaichi (JP)

(73) Assignees: TOYOTA JIDOSHA KABUSHIKI KAISHA, Toyota (JP); SUMITOMO WIRING SYSTEMS, LTD., Yokkaichi (JP)

( * ) Notice: Subject to any disclaimer, the term of this patent is extended or adjusted under 35 U.S.C. 154(b) by 805 days.

(21) Appl. No.: 16/466,486

(22) PCT Filed: Dec. 5, 2017

(86) PCT No.: PCT/JP2017/043644
§ 371 (c)(1),
(2) Date: Jun. 4, 2019

(87) PCT Pub. No.: WO2018/105610
PCT Pub. Date: Jun. 14, 2018

(65) Prior Publication Data
US 2019/0318892 A1 Oct. 17, 2019

(30) Foreign Application Priority Data

Dec. 5, 2016 (JP) .............................. JP2016-235707
Nov. 17, 2017 (JP) .............................. JP2017-221602

(51) Int. Cl.
H01H 37/72 (2006.01)
H01H 45/12 (2006.01)
(Continued)

(52) U.S. Cl.
CPC ............ *H01H 45/12* (2013.01); *H01H 37/72* (2013.01); *H01H 45/04* (2013.01);
(Continued)

(58) Field of Classification Search
CPC ............ H01H 37/72; H01H 2223/044; B60Y 2200/91; B60Y 2200/92
See application file for complete search history.

(56) References Cited

U.S. PATENT DOCUMENTS 6,444,910 B1 * 9/2002 Goto ........................ H01R 4/70
174/70 B
7,724,531 B2 * 5/2010 Kanno ................ B60R 16/0239
361/752
(Continued)

FOREIGN PATENT DOCUMENTS

JP 2001-006643 A 1/2001
JP 2006-087173 A 3/2006
(Continued)

OTHER PUBLICATIONS

"Selecting a Thermoplastic for Your Injection Molded Part", Dec. 4, 2013, Protolabs, Entire Document (Year: 2013).*

*Primary Examiner* — Stephen S Sul
(74) *Attorney, Agent, or Firm* — Dinsmore & Shohl LLP

(57) ABSTRACT

This relay unit includes: a first bus bar; a relay electrically connected to the first bus bar; and an apparatus cover for covering the first bus bar and the relay. The apparatus cover includes: an upper member in a box shape having a covered upper end, the upper member having an opening formed in a lower end; and a lower member bonded to the upper member such that the opening of the upper member is covered with the lower member. The lower member is formed of a resin having heat conductivity that is higher than that of the upper member. The first bus bar is connected to the lower member via a first inner heat conductive sheet such
(Continued)

that heat can be transferred to the lower member, said first inner heat conductive sheet being disposed between the first bus bar and the lower member.

2 Claims, 8 Drawing Sheets

(51) Int. Cl.
   *H01H 45/04* (2006.01)
   *H01M 10/66* (2014.01)
   *H01M 10/655* (2014.01)
   *H01M 10/613* (2014.01)
   *H01M 10/625* (2014.01)
   *B60K 6/22* (2007.10)

(52) U.S. Cl.
   CPC ....... *H01M 10/613* (2015.04); *H01M 10/625* (2015.04); *H01M 10/655* (2015.04); *H01M 10/66* (2015.04); *B60K 6/22* (2013.01); *B60Y 2200/91* (2013.01); *B60Y 2200/92* (2013.01); *H01H 2223/044* (2013.01); *H01M 2220/20* (2013.01)

(56) References Cited

U.S. PATENT DOCUMENTS

| | | | |
|---|---|---|---|
| 2003/0071332 A1* | 4/2003 | Hsu | H01L 27/14625 257/E31.127 |
| 2005/0111166 A1* | 5/2005 | Kita | H05K 7/026 361/624 |
| 2006/0036362 A1* | 2/2006 | Ikeda | H05K 7/026 701/105 |
| 2007/0217161 A1* | 9/2007 | Wu | H01L 23/3737 257/E23.083 |
| 2009/0084602 A1* | 4/2009 | Fukuda | H01L 23/10 174/520 |
| 2012/0057318 A1* | 3/2012 | Oota | H05K 7/20854 361/753 |
| 2014/0220391 A1* | 8/2014 | Fujii | H01M 50/20 429/7 |
| 2014/0335385 A1* | 11/2014 | Ikeya | H01M 50/20 429/121 |
| 2015/0076685 A1* | 3/2015 | Abe | H01L 23/145 165/170 |
| 2016/0353563 A1* | 12/2016 | Morimoto | B60L 53/16 |
| 2018/0026381 A1* | 1/2018 | Haraguchi | H01R 11/12 439/76.2 |
| 2019/0176448 A1* | 6/2019 | Mukohata | B32B 37/153 |
| 2019/0221906 A1* | 7/2019 | Yamamoto | H01M 10/617 |

FOREIGN PATENT DOCUMENTS

| | | |
|---|---|---|
| JP | 2012-243446 A | 12/2012 |
| JP | 2014-079093 A | 5/2014 |

* cited by examiner

RELAY UNIT

CROSS-REFERENCE TO RELATED APPLICATIONS

This application is a national stage application, filed under 35 U.S.C. § 371, of International Patent Application No. PCT/JP2017/043644 filed on Dec. 5, 2017, which claims priority to Japanese Patent Application No. 2017-221602 filed on Nov. 17, 2017 and Japanese Patent Application No. 2016-235707 filed on Dec. 5, 2016, each of which is incorporated herein by reference in their entireties.

TECHNICAL FIELD

The present disclosure relates to a relay unit which is housed in a battery case.

BACKGROUND

Vehicles such as electric automobiles and hybrid electric vehicles are equipped with an electric motor for driving the vehicle. In addition, some vehicles are equipped with a power generator. A rotary electric machine such as the electric motor or the power generator is connected to a battery via an inverter. In this configuration, a relay is connected between the inverter, which is a load of the battery, and the battery, and the relay is controlled by a control device, to switch an electrical connection state between the battery and the inverter.

Patent Literature 1 discloses structure of a vehicle in which a relay is housed inside an electric equipment housing, along with other electric equipment components. One end of a bus bar is electrically connected to a connection point of the relay, and the other end of the bus bar is electrically connected to an output terminal of a battery block at an outer side of the electric equipment housing. Further, an intermediate portion of the bus bar is connected via an electrically insulating and heat-dissipating sheet to a chassis which is a part of the vehicle, at an outer side of the electric equipment housing. Patent Literature 1 also discloses that the bus bar does not need to be connected to the chassis, and may instead be connected to a housing which houses the battery system. With this configuration, heat generated in the relay can be thermally conducted and discharged to the side of the chassis or the other housing.

CITATION LIST

Patent Literature

Patent Literature 1: JP 2014-79093 A

SUMMARY

Technical Problem

However, a position where the bus bar extending from the electric equipment housing is connected to the chassis, or the housing which houses the battery system, is significantly distanced from the connection point inside the relay, where heat tends to be generated. Because of this, a distance between the connection point and the heat discharge portion of the relay may become large, which may result in difficulty in discharging heat from the relay, and consequently, reduction of cooling efficiency of the relay.

An advantage of the present disclosure lies in improving the cooling efficiency of the relay in a relay unit which is housed in a battery case.

Solution to Problem

According to one aspect of the present disclosure, there is provided a relay unit housed in a battery case, the relay unit comprising: a first bus bar; a relay that is electrically connected to the first bus bar; and a device cover that covers the first bus bar and the relay, wherein the device cover includes an upper member which has a box shape with an upper end closed and with an opening formed at a lower end, and a lower member which is combined with the upper member in a manner to close the opening of the upper member, the lower member is formed from a resin having a higher heat conductive property than the upper member, and the first bus bar is connected to the lower member in a manner to allow transfer of heat, via a first inner heat conductive sheet placed between the first bus bar and the lower member.

According to the relay unit of the above-described aspect of the present disclosure, the first bus bar which is positioned in the device cover is connected to the lower member of the device cover in a manner to allow transfer of heat. With this configuration, when the lower member is connected to the battery case in a manner to allow transfer of heat, a distance from the connection point of the relay to the battery case serving as a heat discharge portion can be easily reduced in a heat discharge path of the relay. In addition, the battery case has a larger thermal capacity. Because of this, it becomes easier to discharge the heat generated in the relay, over a short distance, to the portion having a large thermal capacity, and consequently, cooling efficiency of the relay can be improved. Further, the first bus bar and the lower member are connected to each other via the first inner heat conductive sheet. With this configuration, even when the lower member is formed from a material which is easily fractured, it becomes possible to prevent fracturing of the lower member caused by collision of the lower member with the first bus bar due to vibration. Moreover, the lower member is formed from a resin having a higher thermal conductivity than that of the upper member. Thus, it is not necessary to set a high thermal conductivity for the upper member, and the heat discharging capability when the heat conductive path including the lower member is used can be improved while not increasing the cost of the device cover.

According to another aspect of the present disclosure, the relay unit further comprises an outer heat conductive sheet that is placed at a lower side of the lower member, wherein the first bus bar is connected to the outer heat conductive sheet in a manner to allow transfer of heat, via the first inner heat conductive sheet and the lower member.

According to the above-described structure, in a case where the battery case is connected at the lower side of the lower member of the device cover via the outer heat conductive sheet, even if the lower member is formed from a material which is easily fractured, it becomes possible to prevent the fracturing of the lower member caused by collision of the lower member with the battery case due to vibration.

According to another aspect of the present disclosure, the relay unit further comprises a second bus bar that is covered by the device cover, wherein the relay is electrically connected to each of the first bus bar and the second bus bar, between the first bus bar and the second bus bar, a first recess and a second recess which are partitioned by an electrically insulating wall are formed on an upper surface of the lower member, the first inner heat conductive sheet is placed in the first recess and the first bus bar is placed in an overlapping manner at an upper side of the first inner heat conductive sheet in the first recess, a second inner heat conductive sheet is placed in the second recess and the second bus bar is placed in an overlapping manner at an upper side of the second inner heat conductive sheet in the second recess, and the first bus bar is connected to the outer heat conductive sheet in a manner to allow transfer of heat, via the first inner heat conductive sheet and the lower member, and the second bus bar is connected to the outer heat conductive sheet in a manner to allow transfer of heat, via the second inner heat conductive sheet and the lower member.

According to the above-described structure, the first inner heat conductive sheet which contacts the first bus bar at the lower side and the second inner heat conductive sheet which contacts the second bus bar at the lower side are separately placed in the first recess and the second recess which are partitioned by the electrically insulating wall. Because of this, even when moisture enters the device cover or even when water vapor inside the device cover condenses, and water is accumulated at a lower end of the device cover, short-circuiting of the first bus bar and second bus bar at an outer side of the relay can be prevented.

According to another aspect of the present disclosure, in the relay unit, the outer heat conductive sheet is adhered to a lower surface of the lower member, and a sheet protection wall which protrudes to a lower side is formed on a portion, of the lower surface of the lower member, opposing at least a part of an outer circumferential surface of the outer heat conductive sheet.

According to the above-described structure, during transport of the relay unit including the device cover and the outer heat conductive sheet, contact of an object or a person outside of the relay unit with the outer heat conductive sheet and consequent peeling of the outer heat conductive sheet from the lower member can be suppressed.

According to another aspect of the present disclosure, in the relay unit, the outer heat conductive sheet has a rectangular or square shape when viewed from one side in a thickness direction, the sheet protection wall is formed in a rectangular or square cross section to surround the outer heat conductive sheet, and a height of the sheet protection wall is larger than a thickness of the outer heat conductive sheet.

According to the above-described structure, peeling of the outer heat conductive sheet from the lower member of the cover can be suppressed to a higher degree.

According to another aspect of the present disclosure, in the relay unit, a notch is formed on the sheet protection wall on an outer circumferential surface including a lower end of the outer heat conductive sheet, to expose a portion in a circumferential direction.

According to the above-described structure, during the transport of the relay unit including the device cover and the outer heat conductive sheet, when a surface film is affixed onto the lower surface of the outer heat conductive sheet, it becomes easier to remove the surface film from the outer heat conductive sheet through the notch when the transport is completed.

Advantageous Effects of the Disclosure

According to the relay unit of various aspects of the present disclosure, the cooling efficiency of the relay can be improved.

DESCRIPTION OF EMBODIMENTS

Figure 1:
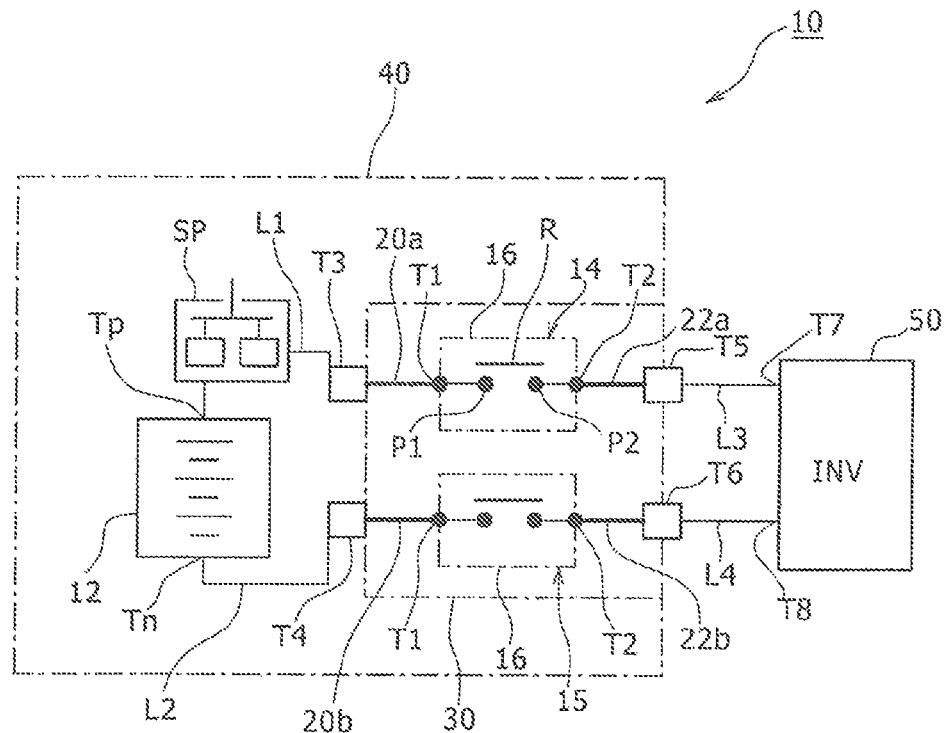
FIG. 1 is a circuit diagram showing a battery relay connection structure for equipment on a vehicle.

An embodiment of the present disclosure will now be described with reference to the drawings. Shapes, materials, and numbers described below are merely exemplary for the purpose of explanation, and may be suitably changed according to the specification of the vehicle including a battery relay connection structure for equipment on a vehicle. In the following description, elements similar in all drawings are assigned the same reference numerals for explanation. In addition, in the following description, reference numerals which are mentioned earlier will be used as necessary.

In addition, in the following description, a configuration will be described in which a load of a battery is an inverter connected to a motor, but the embodiment is not limited to such a configuration, and the load may alternatively be other electric components.

FIG. 1 is a circuit diagram showing a battery relay connection structure 10 for equipment on a vehicle according to an embodiment of the present disclosure. The battery relay connection structure 10 for equipment on a vehicle will hereinafter be referred to also simply as a battery relay connection structure 10. The battery relay connection structure 10 is equipped on a vehicle. The vehicle is an electric automobile or a hybrid electric vehicle having a motor (not shown), which is a rotary electric machine, as a drive source of the vehicle. When the vehicle is the hybrid electric vehicle, the vehicle comprises an engine as a drive source in addition to the motor. A battery module 12 which is a battery is connected to the motor via an inverter 50. The battery module 12 is a part of the battery relay connection structure 10. In addition, a positive electrode (cathode) relay 14 and a negative electrode (anode) relay 15 are connected between the battery module 12 and the inverter 50.

Specifically, the battery relay connection structure 10 comprises the battery module 12, first bus bars 20a and 20b, second bus bars 22a and 22b, the positive electrode relay 14, the negative electrode relay 15, a device cover 30, and a battery case 40. The battery module 12 is formed by a plurality of battery cells being electrically connected in series. Alternatively, the battery module 12 may include a structure in which some of the battery cells are connected in parallel. The battery module 12 is housed in the battery case 40.

Figure 2:
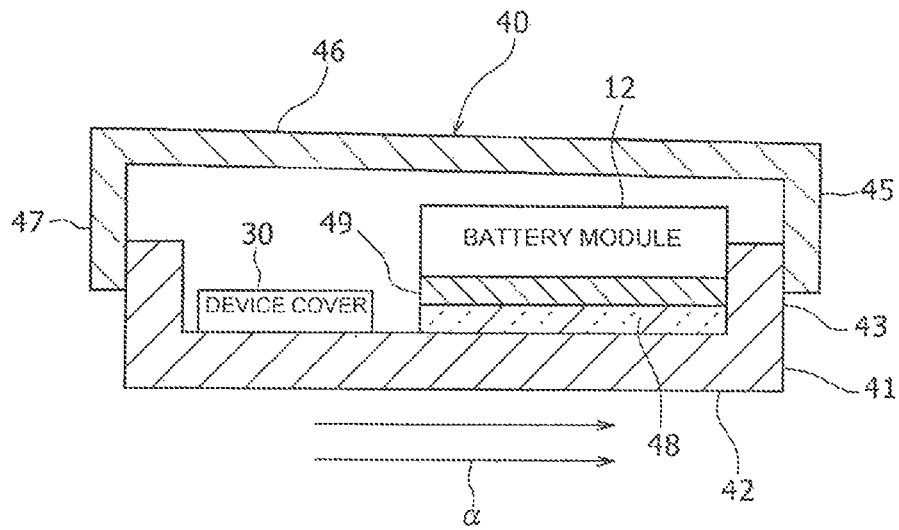
FIG. 2 is a cross-sectional diagram showing a battery module and a device cover placed in a battery case according to an embodiment of the present disclosure.

FIG. 2 is a cross-sectional diagram showing the battery module 12 and the device cover 30 placed in the battery case 40, in the present embodiment. The battery case 40 is formed by a case lower member 41 and a case upper member 45 being combined with each other. The case lower member 41 includes a bottom plate portion 42 and an outer circumferential wall portion 43 which extends upright from an outer edge of the bottom plate portion 42. The case upper member 45 includes a top plate portion 46 and an outer circumferential wall portion 47 which is connected to an outer edge of the top plate portion 46 and which protrudes to a lower side. In a state where the case upper member 45 is fitted from the outer side at an upper side of the case lower member 41, the case upper member 45 is combined with the case lower member 41 by a fastening means (not shown) such as a bolt or the like. Each of the case upper member 45 and the case lower member 41 is formed from a metal such as iron and aluminum. For example, the case lower member 41 is formed by a die cast of an aluminum alloy. With this configuration, a heat discharge capability of the case lower member 41 can be set high.

Figure 3:
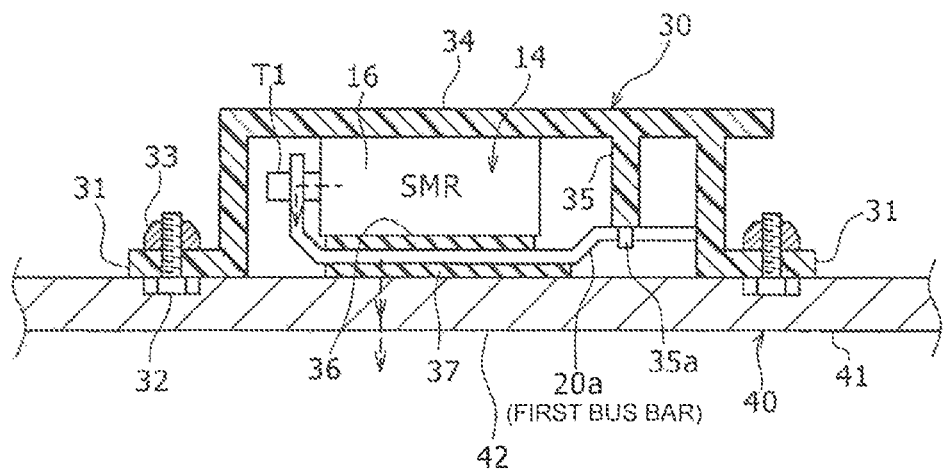
FIG. 3 is a cross-sectional diagram showing a state in which a first bus bar in a device cover is connected to a case lower member which is a part of a battery case in an embodiment of the present disclosure.

Inside the battery case 40, the battery module 12, the first bus bars 20a and 20b, the second bus bars 22a and 22b, the positive electrode relay 14, the negative electrode relay 15, and the device cover 30 which are shown in FIGS. 1 and 3, and which will be described later, are housed. In addition, the device cover 30 covers the first bus bars 20a and 20b, the second bus bars 22a and 22b, the positive electrode relay 14, and the negative electrode relay 15. In other words, the device cover 30 covers these elements from the outside.

As shown in FIG. 2, the battery module 12 is fixed on the bottom plate portion 42 of the case lower member 41 of the battery case 40. In this process, a plate-shape heat insulation member 48 and a heat conductive member 49 are layered in order over the bottom plate portion 42, and the battery module 12 is placed at the upper side of the heat conductive member 49. The heat conductive member 49 is formed by sealing a heat absorption gel, which is a heat absorption agent serving as a coolant, in a housing formed by aluminum sheets. The heat conductive member 49 absorbs, with the heat absorption gel, heat transferred from the battery module 12 through the housing to a part of the heat absorption gel, and diffuses and discharges the absorbed heat to the entirety of the heat absorption gel. With this configuration, heat insulation capability by the heat insulation member 48, between the battery module 12 and the lower member 41, can be improved. Alternatively, the heat conductive member 49 placed between the battery module 12 and the case lower member 41 may be omitted.

In addition, in a state where the battery case 40 is fixed on a vehicle body (not shown) of the vehicle, a bottom of the case lower member 41 of the battery case 40 is exposed to the outside of the vehicle. With this configuration, during travel of the vehicle, the case lower member 41 can be cooled by traveling airflow flowing in a direction of an arrow α of FIG. 2. The traveling airflow generally has a temperature which is lower than or equal to 60° C., and thus, a temperature of the battery case 40 which may become a temperature higher than 60° C. can be reduced by the traveling airflow. The battery case 40 is not limited to the structure where the case lower member 41 is exposed to the outside of the vehicle, and alternatively, a structure may be employed in which, for example, a cooling airflow is supplied around the battery case 40 through a duct by driving of a blower motor or the like, to cool the battery case 40.

At an upper side of the case lower member 41 of the battery case 40, the device cover 30 is fixed. The device cover 30 is a member called a junction box, and is formed by a resin. A detailed structure of the device cover 30 will be described later with reference to FIG. 3. Referring back to FIG. 1, the first bus bars 20a and 20b, the second bus bars 22a and 22b, the positive electrode relay 14, and the negative electrode relay 15 are placed inside the device cover 30. The relays 14 and 15 are formed by housing a relay body inside a relay case 16 made of an electrically insulating material such as a resin. The relay body comprises two fixed connection points P1 and P2, a movable piece R which can be moved toward and away from the fixed connection points P1 and P2, and an excitation coil (not shown) which switches a connection state between the movable piece R and the fixed connection points P1 and P2. In the relays 14 and 15, at an outer side of the relay case 16, two relay terminals T1 and T2 are exposed, and are respectively electrically connected to the fixed connection points P1 and P2 of the relay body.

In these positive electrode and negative electrode relays 14 and 15 having such a structure, heat tends to be generated near the fixed connection points P1 and P2 inside the relay. The inside connection points P1 and P2 are connected to the relay terminals T1 and T2, and the bus bars to be described later are connected to the relay terminals T1 and T2. In consideration of this, in the present embodiment, as will be described later, the bus bar is configured so that heat can be easily discharged at portions near the relay terminals T1 and T2, so that a cooling property of the relays 14 and 15 is improved.

Specifically, in the positive electrode relay 14 and the negative electrode relay 15, one end of the first bus bar 20a and one end of the first bus bar 20b are respectively connected to the relay terminal T1 on the side of the battery module 12. Further, the other end of the first bus bar 20a and the other end of the first bus bar 20b are connected to battery side connector terminals T3 and T4, attached to the device cover 30. The battery side connector terminal T3 connected to the positive electrode relay 14 and a positive electrode output terminal Tp of the battery module 12 are connected to each other by a wire line L1 via a service plug SP.

The battery side connector terminal T4 connected to the negative electrode relay 15 and a negative electrode output terminal Tn of the battery module are connected to each other by a wire line L2. With this configuration, the positive electrode output terminal Tp of the battery module 12 and the first bus bar 20a are electrically connected to each other, and the negative electrode output terminal Tn of the battery module 12 and the first bus bar 20b are electrically connected to each other. The service plug SP is configured to allow manual opening and closing of a power supply circuit, by removal and insertion of a grip with respect to a housing.

In the positive electrode relay 14 and the negative electrode relay 15, one end of the second bus bar 22a and one end of the second bus bar 22b are respectively connected to the relay terminal T2 on the side of the inverter 50. The other end of the second bus bar 22a and the other end of the second bus bar 22b are respectively connected to inverter side connector terminals T5 and T6 attached to the device cover 30. A part of the device cover 30 is integrally attached to the case lower member 41 of the battery case 40 (FIG. 1), and the two inverter side connector terminals T5 and T6 are exposed to the outside of the lower member 41 through the integrated portion. The two inverter side connector terminals T5 and T6 are respectively connected by two wire lines L3 and L4 to a positive electrode input terminal T7 and a negative electrode input terminal T8 of the inverter 50 placed distanced from the battery case 40. With this configuration, the positive electrode input terminal T7 of the inverter 50 and the second bus bar 22a are electrically connected to each other, and the negative electrode input terminal T8 of the inverter 50 and the second bus bar 22b are electrically connected to each other.

The relays 14 and 15 switch the electrical connection state between the battery module 12 and the inverter 50 by switching of electricity application and stopping of the electricity to the excitation coil of the relay body. The switching of the relays 14 and 15 is controlled by a control device (not shown).

Next, with reference to FIG. 3, a heat discharge structure of the relays 14 and 15 using the bus bars 20a, 20b, 22a, and 22b will be described. FIG. 3 is a cross-sectional diagram showing a state in which the first bus bar 20a in the device cover 30 is connected to the case lower member 41 of the battery case 40. FIG. 3 only shows the first bus bar 20a connected to the positive electrode relay 14, among the four bus bars 20a, 20b, 22a, and 22b shown in FIG. 1. In the following, the positive electrode relay 14 may also be simply referred to as a relay 14.

The device cover 30 has an approximate box shape with an upper end thereof closed, and with an opening formed at a lower end thereof. A flange 31 facing outward is formed at a peripheral portion of the opening of the lower end of the device cover 30. In the battery case 40, the flange 31 of the device cover 30 is overlapped over the bottom plate portion 42 of the case lower member 41. In this state, a screw portion of the bolt 32 fixed on the case lower member 41 penetrates upward through the flange 31, and a nut 33 is combined with the screw portion protruding from an upper surface of the flange 31. With this configuration, the device cover 30 is fixed on the case lower member 41. On a lower surface of the top plate portion 34 positioned at the upper end of the device cover 30, a protrusion 35 protruding toward an inner side is formed, and a bus bar retaining hook 35a is formed at a lower end of the protrusion 35. For example, the bus bar retaining hook 35a is folded at a lower end in a right angle, to engage and retain the first bus bar 20a at an upper side thereof.

The relay case 16 is fixed on the lower surface of the top plate portion 34 of the device cover 30. In addition, the relay terminal T1 of the relay body protrudes on one side surface in a lateral direction (left side surface of FIG. 3) of the relay case 16. One end of the first bus bar 20a is connected to the relay terminal T1 at an outer side of the one side surface in the lateral direction of the relay case 16. An intermediate portion of the first bus bar 20a is guided through the lower side of the relay case 16 in the lateral direction (left-and-right direction of FIG. 3), and toward the other side in the lateral direction (right side in FIG. 3) of the relay case 16. The other end side portion of the first bus bar 20a is retained by the bus bar retaining hook 35a formed on the device cover 30, and the other end of the first bus bar 20a is connected to the battery side connector terminal T3 (FIG. 1) which is exposed to the outside of the device cover 30. One end of the wire line L1 (FIG. 1) electrically connected to the battery module 12 is connected to the battery side connector terminal T3 at an outer side of the device cover 30.

The intermediate portion of the first bus bar 20a is sandwiched by the lower surface of the relay case 16 and an upper surface of the case lower member 41 of the battery case 40 with two upper and lower electrically insulating heat conductive sheets 36 and 37 therebetween. The lower heat conductive sheet 37 corresponds to an inner heat conductive sheet. With this configuration, the intermediate portion of the first bus bar 20a is connected to the relay case 16 in a manner to allow transfer of heat, via the upper heat conductive sheet 36. In addition, the intermediate portion of the first bus bar 20a is connected to the case lower member 41 in a manner to allow transfer of heat, via the lower heat conductive sheet 37. Alternatively, the upper heat conductive sheet 36 between the intermediate portion of the first bus bar 20a and the relay case 16 may be omitted, so that the intermediate portion of the first bus bar 20a directly contacts the lower surface of the relay case 16. With such a configuration also, the heat can be transferred from the relay case 16 to the intermediate portion of the first bus bar 20a. In addition, in the present specification, "connected in a manner to allow transfer of heat" includes both meanings of connection of two members via one or more members having heat conductive properties and of direct contact of two members to allow heat transfer.

In the battery relay connection structure 10 described above, a heat discharge path is formed in which heat generated at the connection point inside the relay 14 is transferred in the order of the connection point inside the relay→the relay terminal T1→the first bus bar 20a→the lower heat conductive sheet 37→the case lower member 41, as shown by a broken line arrow in FIG. 3. The heat transferred to the case lower member 41 is then transferred to the outside air (heat is discharged). In this manner, because the first bus bar 20a positioned in the device cover 30 is connected to the battery case 40 in a manner to allow transfer of heat, a distance from the connection point of the relay 14 to the case lower member 41 serving as the heat discharge portion can be easily shortened in the heat discharge path of the relay 14. In addition, the case lower member 41 is larger than the device cover 30, and also has a larger thermal capacity. Because of this, the heat generated in the relay 14 can be easily discharged, over a short distance, to the portion of a large thermal capacity, and thus, the cooling efficiency of the relay 14 can be improved.

On the other hand, in the case of the structure of Patent Literature 1, the intermediate portion of the bus bar connected to the relay is connected to the chassis which is a part of the vehicle or to the housing which houses the battery system, at the outer side of the electric equipment housing which corresponds to the device cover. In this structure, the distance of the heat discharge path from the relay to the portion of the large thermal capacity tends to become long. Thus, the cooling efficiency of the relay cannot be easily improved.

Further, according to the present embodiment, the heat is transferred from the relay case 16 via the upper heat conductive sheet 36 or directly to the first bus bar 20a, and thus, the cooling efficiency of the relay 14 can be further improved.

In addition, because the device cover 30 is fastened to the case lower member 41 by the fastening means including the bolt and the nut, the heat conductive sheets 36 and 37 may be compressed between the relay case 16 and the case lower member 41 via the first bus bar 20a. With this configuration, the heat conductive sheets 36 and 37 can be contacted between the relay case 16 and the first bus bar 20a and between the first bus bar 20a and the case lower member 41 with a high degree of contact, and thus, the heat transfer capability can be further improved.

In FIG. 3 described above, only the heat discharge structure including the first bus bar 20a connected to the positive electrode relay 14, of the four bus bars 20a, 20b, 22a, and 22b shown in FIG. 1, is described, but the heat discharge structure is similarly formed for the other bus bars 20b, 22a, and 22b. In this structure, one end of the second bus bar 22a (FIG. 1) may be connected to the relay terminal protruding at the other side in the lateral direction (right side of FIG. 3) of the positive electrode relay 14. In this case, the intermediate portion of the second bus bar 22a may extend through the lower side of the relay case 16, and the other end portion of the second bus bar 22a may be guided to the opposite side (left side in FIG. 3) from the other end side portion of the first bus bar 20a. With this configuration, all of the bus bars connected to the positive electrode relay 14 and the negative electrode relay 15 are connected to the case lower member 41 of the battery case 40 in a manner to allow transfer of heat. Alternatively, a configuration may be employed in which, of the first bus bar and the second bus bar, only one of the bus bars is connected to the case lower member 41 in a manner to allow transfer of heat.

Figure 4:
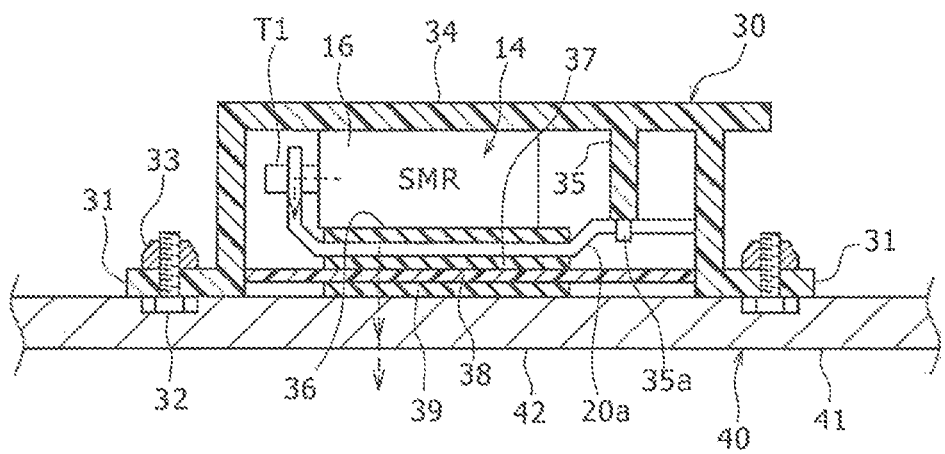
FIG. 4 is a cross-sectional diagram showing a state in which a first bus bar in a device cover is connected to a case lower member which is a part of a battery case in an alternative configuration of an embodiment of the present disclosure.

FIG. 4 is a cross-sectional diagram showing a state in which the first bus bar 20a in the device cover 30 is connected to the case lower member 41 which is a part of the battery case 40 in an alternative configuration of the present embodiment. In the structure of the alternative configuration shown in FIG. 4, in the structure shown in FIGS. 1 to 3, the device cover 30 includes a cover lower member 38 which is placed to close the opening at the lower end of the device cover 30. The cover lower member 38 is formed in a plate shape by a resin having a high heat conductivity. The intermediate portions of the first bus bars 20a and 20b are sandwiched between the relay case 16 and the cover lower member 38 with two upper and lower heat conductive sheets 36 and 37 therebetween. Further, a lower surface of the cover lower member 38 and the case lower member 41 of the battery case 40 sandwich a second heat conductive sheet 39 made of an electrically insulating material such as a resin.

The second heat conductive sheet 39 corresponds to an outer heat conductive sheet. With this configuration, the heat generated at the connection point in the relay 14 is transferred in the order of the connection point in the relay→the relay terminal T1→the first bus bar 20a→the lower heat conductive sheet 37→the cover lower member 38→the second heat conductive sheet 39→the case lower member 41, as shown by a broken line arrow in FIG. 4. The heat transferred to the case lower member 41 is transferred to the outside air (heat is discharged).

According to the structure described above, because the cover lower member 38 made of a resin and the second heat conductive sheet 39 made of an electrically insulating material are placed between the case lower member 41 and the first bus bar 20a, the electrical insulation between the first bus bar 20a and the case lower member 41 can be further improved. In the case of the structure of FIG. 4 also, similar to the structure of FIGS. 1 to 3, the heat conductive sheet 36 at the upper side of the first bus bar 20a may be omitted. In addition, in FIG. 4, only the heat discharge structure including the first bus bar 20a connected to the positive electrode relay 14, of the four bus bars 20a, 20b, 22a, and 22b shown in FIG. 1, is described, but the heat discharge structure is similarly formed for the other bus bars 20b, 22a, and 22b. Alternatively, a configuration may be employed in which, of the first bus bar and the second bus bar, only one of the bus bars is connected to the case lower member 41 in a manner to allow transfer of heat. The other structures and operations are similar to those of the structure of FIGS. 1 to 3.

Figure 5:
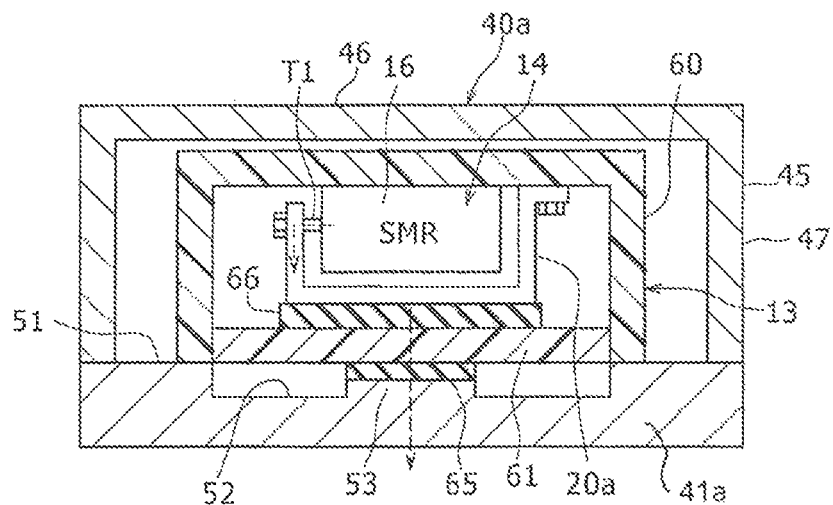
FIG. 5 is a cross-sectional diagram showing a state in which a first bus bar in a device cover is connected to a case lower member which is a part of a battery case in an alternative configuration of an embodiment of the present disclosure.
Figure 6:
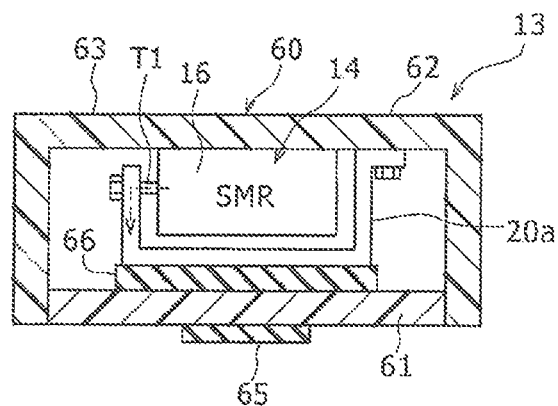
FIG. 6 is a cross-sectional diagram specifically showing the relay unit including the device cover and the relay of FIG. 5.
Figure 7:
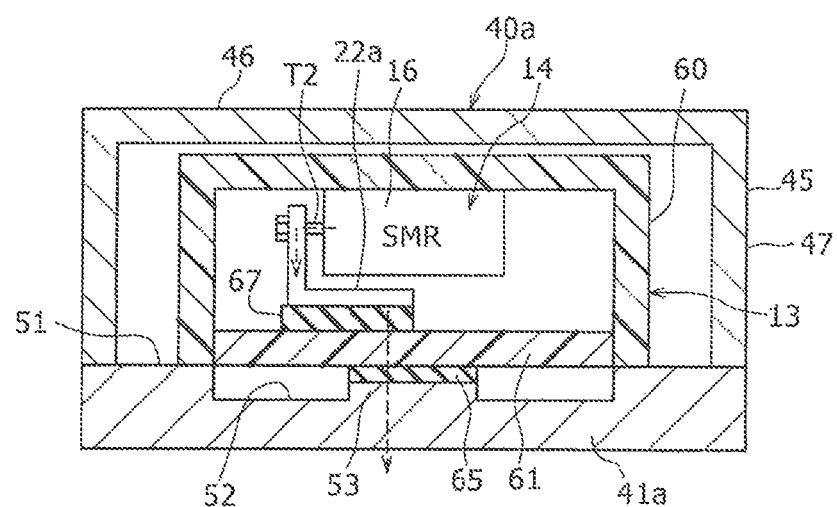
FIG. 7 is a cross-sectional diagram showing a state in which a second bus bar in a device cover is connected to a case lower member which is a part of a battery case in an alternative configuration of an embodiment of the present disclosure.

FIG. 5 is a cross-sectional diagram showing a state in which the first bus bar 20a in a device cover 60 is connected to a case lower member 41a which is a part of a battery case 40a in an alternative configuration of the present embodiment. FIG. 6 is a cross-sectional diagram showing a relay unit 13 which includes the device cover 60 and the positive electrode relay 14. FIG. 7 is a cross-sectional diagram showing a state in which the second bus bar 22a in the device cover 60 is connected to the case lower member 41a.

In the structure of the present configuration, the battery case 40a which is a part of the battery relay connection structure is formed by overlapping and combining the case upper member 45 over an upper surface of the case lower member 41a having a flat plate shape. Specifically, similar to the structures of the configurations described above, the case lower member 41a is formed from a metal such as iron and aluminum. The case lower member 41a has an approximate rectangular or square shape when viewed from above, and an outer circumferential wall 51 is formed on an outer edge of the upper surface over the entire circumference. On the upper surface of the case lower member 41a, a recess 52 is formed at an inner side of the outer circumferential wall 51. In addition, projections 53 having a rectangular or square cross section are formed protruding from a plurality of positions on a bottom surface of the recess 52. Each projection 53 is formed to oppose the positive electrode relay 14 and the negative electrode relay 15 (FIG. 1) at the lower side of the device cover 60. The entirety of the outer circumferential surface of each projection 53 is surrounded by the recess 52. As will be described below, each projection 53 is pressed via an outer heat conductive sheet 65 to a cover lower member 61 which is a part of the device cover 60. The case upper member 45 is overlapped on the upper surface of the outer circumferential wall 51 of the case lower member 41a, and combined by a fastening means (not shown) such as a bolt or the like. With this configuration, an inner space of the battery case 40a is isolated from the outside, and a waterproof structure is formed.

At the inside of the battery case 40a, the positive electrode and the negative electrode relay units 13 are fixed. The negative electrode relay unit has a similar structure to the positive electrode relay unit 13, and thus, in the following, the positive electrode relay unit 13 will be described. As shown in FIGS. 6 and 7, the relay unit 13 includes: the device cover 60; the positive electrode relay 14, the first bus bar 20a, the second bus bar 22a, a first inner heat conductive sheet 66, and a second inner heat conductive sheet 67, which are placed inside the device cover 60; and an outer heat conductive sheet 65.

The device cover 60 is formed by combining the cover upper member 62 and the cover lower member 61. The cover upper member 62 has an approximate box shape with an upper end closed by a top plate portion 63, and with an opening formed at a lower end thereof. The cover lower member 61 has an approximate flat plate shape, and is combined with the cover upper member 62 by a fastening means (not shown) such as a bolt or the like, to close the opening at the lower end of the cover upper member 62.

The cover upper member 62 is formed by an electrically insulating resin. On the other hand, the cover lower member 61 is formed from a resin having a higher heat conducting property than that of the cover upper member 62. For example, the cover lower member 61 is desirably formed by a resin having a thermal conductivity which is 5 times or greater that of the resin forming the cover upper member 62. For example, the thermal conductivity of the resin forming the cover upper member 62 is set to about 0.2 W/mK and the thermal conductivity of the resin forming the cover lower member 61 is set to 1.0~3.5 W/mK. With such a configuration, it is not necessary to set the heat conductive property of the cover upper member 62 high, and thus, the heat discharge capability when the heat conductive path including the cover lower member 61 is used can be improved while suppressing a cost increase of the device cover 60. For example, for the cover lower member 61, a material in which filler is filled in a nylon resin to improve the thermal conductivity may be used. As a material forming the cover upper member 62, polybutylene terephthalate resin (PBT) may be used. The cover upper member 62 is combined with the case lower member 41a of the battery case 40 by a fastening member (not shown) such as a bolt or the like, penetrating through a collar (not shown) formed on an outer circumferential portion at a lower end of the cover upper member 62.

Similar to the structures shown in FIGS. 3 and 4 described above, one end of the first bus bar 20a is connected to the relay terminal T1 at the outer side of one side surface in a longitudinal direction (left side surface of FIGS. 5 and 6) of the relay case 16. An intermediate portion in a longitudinal direction of the first bus bar 20a passes a lower side of the relay case 16 in a longitudinal direction (left-and-right direction of FIGS. 5 and 6) of the relay case, and is guided to the other side in the longitudinal direction (right side in FIGS. 5 and 6) of the relay case. The other end of the first bus bar 20a is combined with the top plate portion 63 of the cover upper member 62 along with one end of an intermediate bus bar (not shown) at the other side in the longitudinal direction of the relay case 16. The other end of the intermediate bus bar is connected to the battery side connector terminal T3 (FIG. 1) which is exposed to the outer side of the device cover 60.

On the other hand, as shown in FIG. 7, one end of the second bus bar 22a is connected to the relay terminal T2 at an outer side of a one side surface in the longitudinal direction (left side surface of FIG. 7) of the relay case 16. An intermediate portion in a longitudinal direction of the second bus bar 22a enters the lower side of the relay case 16, extends in a width direction (directions into and out of the page of FIG. 7) orthogonal to the longitudinal direction at the lower side of the relay case, and is guided to one side in the width direction (back side of the page of FIG. 7) of the relay case. The other end of the second bus bar 22a is connected to the inverter side connector terminal T5 (FIG. 1) which is exposed to the outer side of the device cover 60, at one side in the width direction of the relay case 16. With this configuration, the positive electrode relay 14 is electrically connected respectively to the first bus bar 20a and the second bus bar 22a, between the first bus bar 20a and the second bus bar 22a.

Referring back to FIGS. 5 and 6, the first inner heat conductive sheet 66 is an electrically insulating resin sheet having a high heat conductive property, and is sandwiched between a lower end surface of the first bus bar 20a and the cover lower member 61. The first inner heat conductive sheet 66 is desirably formed from a non-silicone-based resin material. With this configuration, even when the temperature is increased during use of the first inner heat conductive sheet 66, a siloxane gas is not generated, and thus, a connection point defect of the relay caused by siloxane gas can be prevented.

As shown in FIG. 7, the second inner heat conductive sheet 67 is an electrically insulating resin sheet having a high heat conductive property, and is sandwiched between a lower end surface of the second bus bar 22a and the cover lower member 61. Similar to the first inner heat conductive sheet 66, the second inner heat conductive sheet 67 is also desirably formed from a non-silicone-based resin material. Each of the first inner heat conductive sheet 66 and the second inner heat conductive sheet 66 has a lower surface hardness than the cover lower member 61. The first inner heat conductive sheet 66 and the second inner heat conductive sheet 67 may be formed, for example, using an acrylic resin having a low hardness. The first inner heat conductive sheet 66 and the second inner heat conductive sheet 67 are placed distanced from each other.

The outer heat conductive sheet 65 is a resin sheet having a high heat conductive property, and is sandwiched between an upper surface of the projection 53 formed on the case lower member 41a of the battery case 40a and the cover lower member 61. The outer heat conductive sheet 65 has a rectangular or square shape when viewed from one side in a thickness direction. The outer heat conductive sheet 65 has, for example, approximately the same size as an outer shape of the upper surface of the projection 53 of the case lower member 41a. The outer heat conductive sheet 65 has a lower surface hardness than the cover lower member 61. For example, the outer heat conductive sheet 65 may be formed from the same material as that of the inner heat conductive sheets 66 and 67 described above.

Further, the outer heat conductive sheet 65 is placed such that at least a part thereof overlaps the first inner heat conductive sheet 66 and the second inner heat conductive sheet 67 with the cover lower member 61 therebetween, when the battery case 40a and the relay unit 13 are viewed from below. The cover lower member 61 does not directly contact the case lower member 41a, and is connected to the case lower member 41a via the outer heat conductive sheet 65. In this configuration, the projection 53 of the case lower member 41a is pressed onto the cover lower member 61 via the outer heat conductive sheet 65. As shown in FIG. 6, the outer heat conductive sheet 65 is adhered to the lower surface of the cover lower member 61, to form the relay unit 13. With this configuration, the first bus bar 20a is connected to the outer heat conductive sheet 65 in a manner to allow transfer of heat, via the first inner heat conductive sheet 66 and the cover lower member 61. In addition, the second bus bar 22a is connected to the outer heat conductive sheet 65 in a manner to allow transfer of heat, via the second inner heat conductive sheet 67 and the cover lower member 61.

Because of this structure, the first bus bar 20a is connected to the cover lower member 61 in a manner to allow transfer of heat, via the first inner heat conductive sheet 66, and can transfer heat from the cover lower member 61 to the outer heat conductive sheet 65, which is another lower member, and to the battery case 40a. Similarly, the second bus bar 22a is connected to the cover lower member 61 in a manner to allow transfer of heat, via the second inner heat conductive sheet 67, and can transfer heat from the cover lower member 61 to the outer heat conductive sheet 65 and to the battery case 40a.

According to the above-described structure, the heat generated at the connection point inside the positive electrode relay 14 is transferred to the case lower member 41a as shown by a broken line arrow in FIG. 5. Specifically, the heat is transferred in the order of the connection point inside the relay→the relay terminal T1→the first bus bar 20a→the first inner heat conductive sheet 66→the cover lower member 61→the outer heat conductive sheet 65→the case lower member 41a. Similarly, as shown by a broken line arrow in FIG. 7, heat is transferred in the order of the connection point inside the relay→the relay terminal T2→the second bus bar 22a→the second inner heat conductive sheet 67→the cover lower member 61→the outer heat conductive sheet 65→the case lower member 41a. The heat transferred to the case lower member 41a is transferred to the outside air (heat is discharged), so that the heat of the relay can be discharged.

Moreover, according to the relay unit 13 described above, when the cover lower member 61 is connected to the battery case 40a in a manner to allow transfer of heat, in the heat discharge path of the relay, a distance from the connection point of the relay to the battery case 40a serving as a heat discharge portion can be easily shortened. In addition, the battery case 40a has a large thermal capacity. Because of this, it becomes easier to discharge the heat generated in the relay, over a short distance, to a portion of a large thermal capacity, and consequently, the cooling efficiency of the relay can be improved. Furthermore, the first and second bus bars 20a and 22a and the cover lower member 61 are connected in a manner to allow transfer of heat respectively via the first inner heat conductive sheet 66 or the second inner heat conductive sheet 67. With this configuration, even when the cover lower member 61 is formed from a material which is easily fractured, the fracturing of the cover lower member 61, caused by collision of the cover lower member 61 with the first bus bar 20a or the second bus bar 22a due to vibration, can be prevented. Further, the first and second bus bars 20a and 22a are connected to the outer heat conductive sheet 65 in a manner to allow transfer of heat, via the first inner heat conductive sheet or the second inner heat conductive sheet 67, and the cover lower member. With this configuration, the batter) case 40a is connected at the lower side of the cover lower member 61 via the first inner heat conductive sheet or the second inner heat conductive sheet 67. In this case, even when the cover lower member 61 is formed from a material which is easily fractured, fracturing of the cover lower member 61, caused by collision of the cover lower member 61 with the battery case 40a due to vibration, can be prevented. In the present configuration, other structures and operations are similar to those of the structure of FIGS. 1 to 3 or the structure of FIG. 4.

Alternatively, in the structure of FIGS. 5 to 7, in place of the first inner heat conductive sheet 66 and the second inner heat conductive sheet 67, one inner heat conductive sheet may be used in common. The heat transferred to the first bus bar 20a and the second bus bar 22a is transferred to the case lower member 41a through a heat discharge path including this common inner heat conductive sheet.

Figure 8:
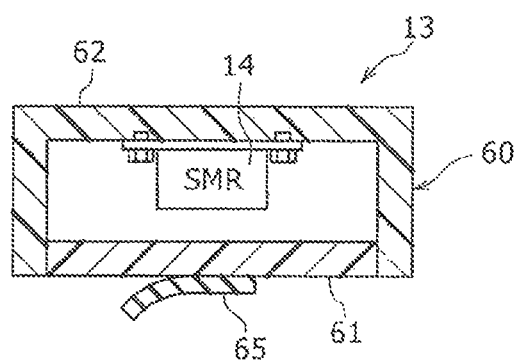
FIG. 8 is a cross-sectional diagram showing a state in which, in a relay unit which is a part of a battery relay connection structure of an alternative configuration of an embodiment of the present disclosure, an outer heat conductive sheet is peeled from a device cover.

FIG. 8 is a cross-sectional diagram showing a state in which the outer heat conductive sheet 65 is peeled from the device cover 60 in the relay unit 13 which is a part of the battery relay connection structure in an alternative configuration of the embodiment. In FIG. 8, the first bus bar, the second bus bar, the first inner heat conductive sheet, and the second inner heat conductive sheet are omitted. Similar to the structure of FIG. 6, the outer heat conductive sheet 65 is adhered to the lower surface of the cover lower member 61. In such a structure, when the device is transported to a location where the relay unit 13 is assembled to the battery case or the like, an object or a person outside of the relay unit may unexpectedly contact the outer heat conductive sheet 65, and a force may be applied to the outer heat conductive sheet 65. With this process, there is a possibility that the outer heat conducive sheet 65 will be peeled from the cover lower member 61. In addition, with a movement of a moving member (not shown) in a state where the relay unit 13 is placed on the moving unit, the device cover 60 of the relay unit 13 may vibrate, and the outer heat conductive sheet 65 may slide and deviate in position with respect to the cover lower member 61.

Further, when a foreign object such as dust is adhered on the surface of the outer heat conductive sheet 65, the heat conductive property of the outer heat conductive sheet 65 may be degraded. In order to prevent the degradation of the heat conducive property, a configuration may be considered in which a surface film is affixed on the lower surface of the outer heat conductive sheet 65. The surface film is removed before the relay unit 13 is assembled in the battery case 40a (FIG. 5). For this purpose, it is necessary to facilitate the removal operation of the surface film.

Figure 9:
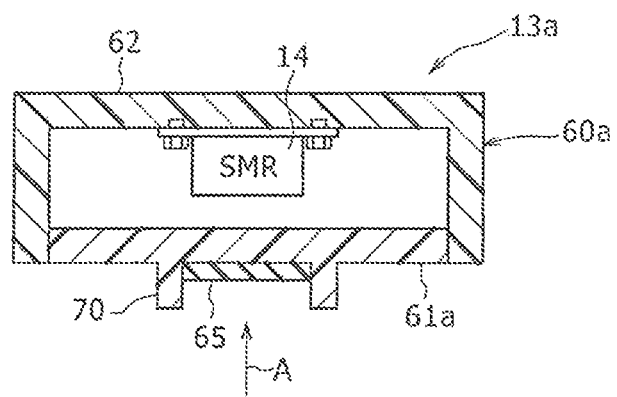
FIG. 9 is a cross-sectional diagram showing a relay unit which is a part of a battery relay connection structure in an alternative configuration of an embodiment of the present disclosure.
Figure 10:
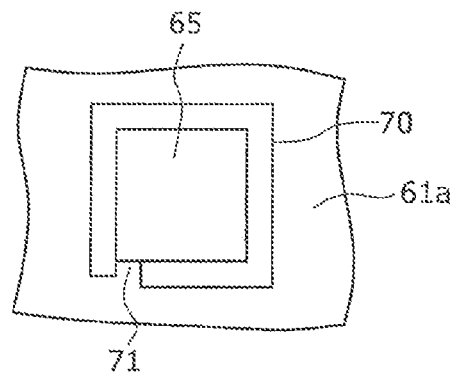
FIG. 10 is a diagram viewing in a direction of the arrow A in FIG. 9.

An alternative configuration of the embodiment of the present disclosure described next with respect to FIGS. 9 and 10 was made to improve this point. FIG. 9 is a cross-sectional diagram showing a relay unit 13a of the alternative configuration of the embodiment of the present disclosure. FIG. 10 is a diagram showing the structure of FIG. 9, viewed from a direction of an arrow A. In FIG. 9, similar to FIG. 8, the first bus bar, the second bus bar, the first inner heat conductive sheet, and the second inner heat conductive sheet are omitted.

In the structure of the present configuration, the outer heat conductive sheet 65 is adhered to a lower surface of a cover lower member 61a of a device cover 60a. Further, on a portion, of the lower surface of the cover lower member 61a, opposing at least a part of an outer circumferential surface of the outer heat conductive sheet 65, a sheet protection wall 70 which protrudes to a lower side is formed. The sheet protection wall 70 is formed in a tube shape with a cross section of an approximate rectangle or square, surrounding the outer heat conductive sheet 65. A height of the sheet protection wall 70 is larger than a thickness of the outer heat conductive sheet 65.

In addition, on a portion, of a part in a circumferential direction of the sheet protection wall 70, opposing a side surface of a part of the outer circumferential surface of the outer heat conductive sheet 65, a notch 71 is formed over an entire length in a height direction of the sheet protection wall 70. The notch 71 is thus formed to expose a part in the circumferential direction, on the outer circumferential surface of the outer heat conductive sheet 65, including the lower end.

During transport of the relay unit 13a, a surface film (not shown) for preventing adhesion of foreign objects to a lower surface is affixed to the lower surface of the outer heat conductive sheet 65. The surface film is removed before the relay unit 13a is assembled in the battery case.

According to the above-described structure, at the lower surface of the cover lower member 61a, on a portion opposing at least a part of the outer circumferential surface of the outer heat conductive sheet 65, the sheet protection wall 70 which protrudes to a lower side is formed. With this structure, during the transport of the relay unit 13a, it is possible to suppress peeling of the outer heat conductive sheet 65 from the cover lower member 61a by contact of an object or a person outside of the device with the outer heat conductive sheet.

Further, at the lower surface of the cover lower member 61a, the sheet protection wall 70 is formed in the tubular shape having the cross section of an approximate rectangle or square, surrounding the outer heat conductive sheet 65, and the height of the sheet protection wall 70 is larger than the thickness of the outer heat conductive sheet 65. With this structure, the peeling of the outer heat conductive sheet 65 from the cover lower member 61a can be further suppressed.

Moreover, in the sheet protection wall 70, the notch 71 is formed to expose a part in the circumferential direction, on the outer circumferential surface including the lower end of the outer heat conductive sheet 65. With this structure, during the transport of the relay unit 13a, when the surface film is affixed to the lower surface of the outer heat conductive sheet 65, the surface film can be easily removed from the outer heat conductive sheet 65 through the notch 71, upon completion of the transport. The removal of the surface film is executed by a worker. For example, the worker can attach an adhesion tape to the lower surface of the surface film through the notch 71, and the surface film can be easily removed from the outer heat conductive sheet 65. Alternatively, the worker can move a finger through the notch 71 into the inside of the sheet protection wall 70, and hook the finger on the affixed side of the surface film, to easily remove the surface film from the outer heat conductive sheet 65. Other structures and operations are similar to those of the structure of FIGS. 1 to 3, the structure of FIG. 4, or the structure of FIGS. 5 to 7.

Figure 11:
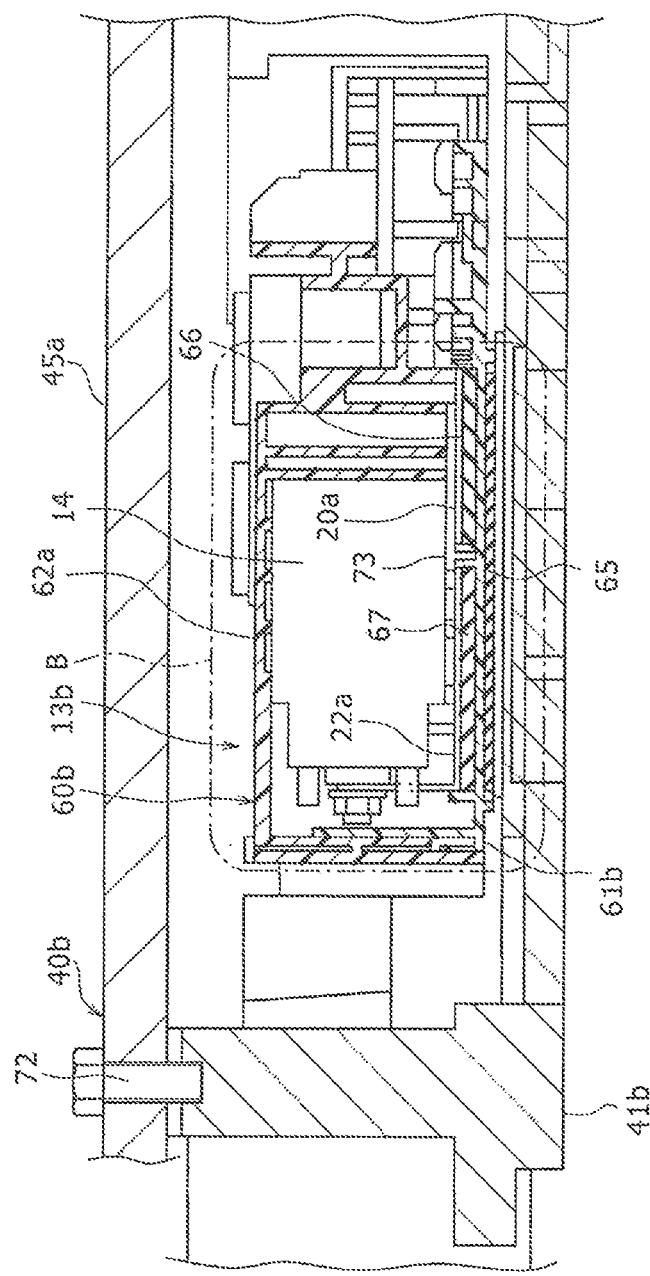
FIG. 11 is a cross-sectional diagram showing a state in which a first bus bar and a second bus bar in a device cover are connected to a case lower member which is a part of a battery case in an alternative configuration of an embodiment of the present disclosure.
Figure 12:
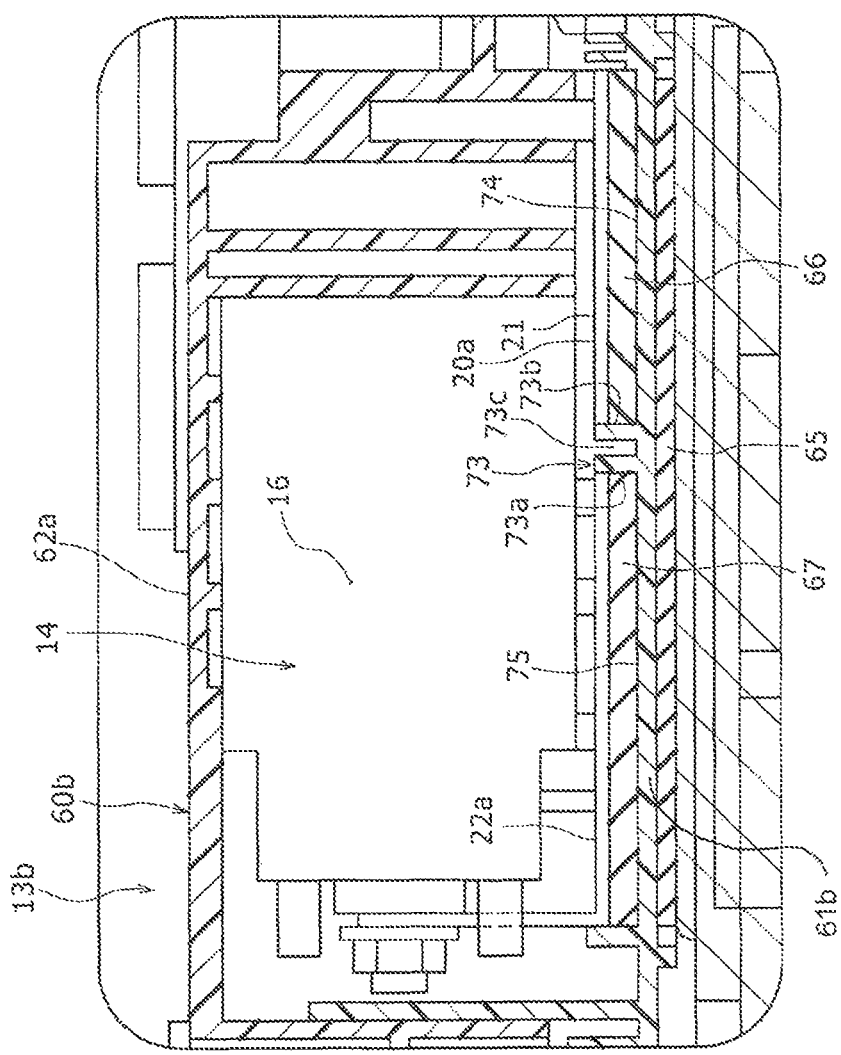
FIG. 12 is an enlarged view of a B part of FIG. 11.
Figure 13:
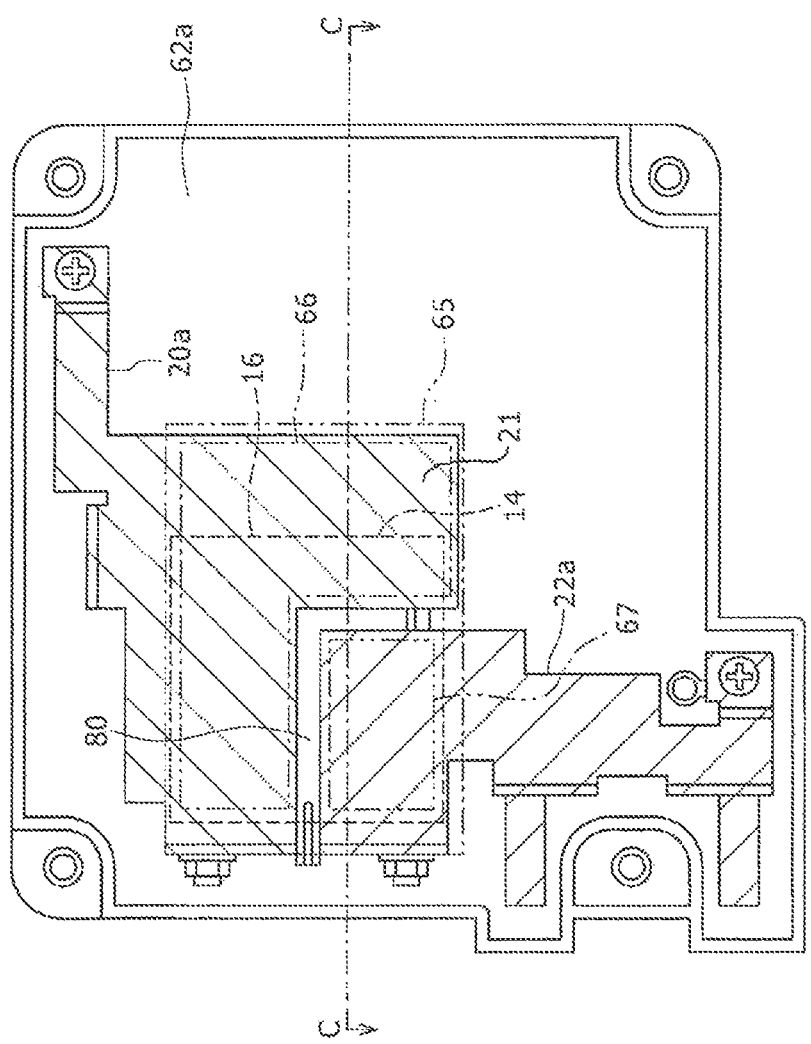
FIG. 13 is a diagram showing a state in which a cover lower member of a device cover is removed in a relay unit forming a battery relay connection structure in an alternative configuration of an embodiment of the present disclosure, with a part omitted and viewed from below.
Figure 14:
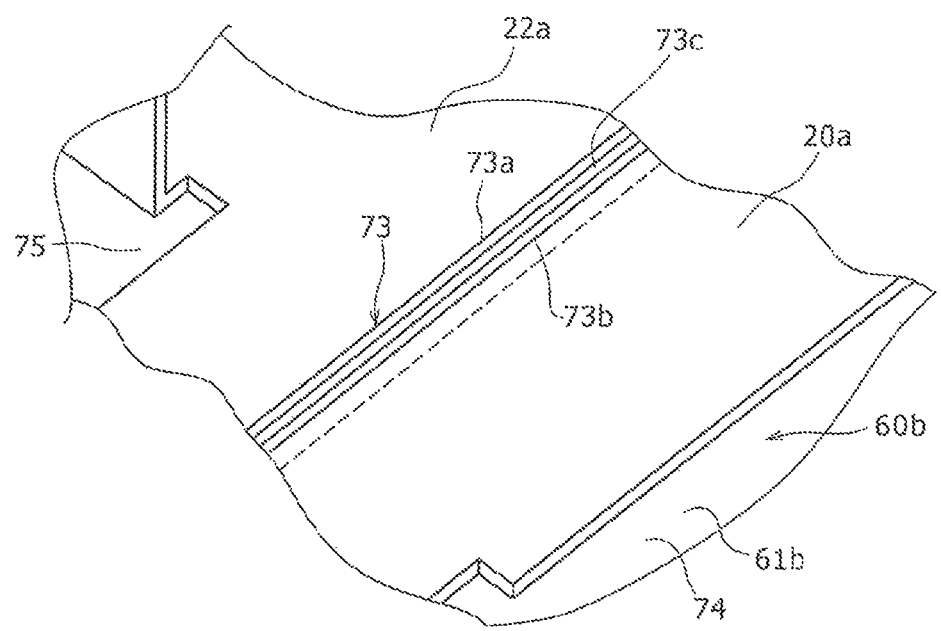
FIG. 14 is a perspective diagram showing a part of a first bus bar and a second bus bar placed in a lower member of a device cover in a relay unit which is a part of a battery relay connection structure of an alternative configuration of an embodiment of the present disclosure.

FIG. 11 is a cross-sectional diagram showing a state in which the first bus bar 20a and the second bus bar 22a in a device cover 60b are connected to a case lower member 41b which is a part of a battery case 40b in an alternative configuration of the embodiment of the present disclosure. FIG. 12 is an enlarged view of a B part of FIG. 11. FIG. 13 is a diagram showing the relay unit 13b which is a part of the battery relay connection structure, viewed from below, with a part omitted, and in a state where a cover lower member 61b of the device cover (FIG. 12) is removed. FIG. 14 is a perspective diagram showing a part of the first bus bar 20a and the second bus bar 22a placed on the cover lower member 61b in the relay unit 13b.

In the structure of the present configuration, as shown in FIGS. 11 and 12, the battery case 40b is formed by combining a case upper member 45a and a case lower member 41b with a bolt 72. The device cover 60b, which is a part of the relay unit 13b, is fixed to the case lower member 41b. The device cover 60b is formed by combining a cover upper member 62a and the cover lower member 61b. At an inner side of the device cover 60b, the positive electrode relay 14 is fixed to the cover upper member 62a.

As shown in FIG. 13, intermediate portions in the longitudinal direction of the first bus bar 20a and the second bus bar 22a are placed aligned in a width direction of the relay case 16 (up-and-down direction of FIG. 13) at a lower side of the positive electrode relay 14 (front side of the page of FIG. 13). In the intermediate portion in the longitudinal direction of the first bus bar 20a, at a portion placed at a lower side of the relay case 16, a projection 21 protruding on one side in the width direction of the relay case 16 (lower side of FIG. 13) is formed. FIGS. 11 and 12 correspond to a C-C cross section of FIG. 13. The projection 21 is placed aligned in the longitudinal direction of the relay case 16 (left-and-right direction of FIGS. 11, 12, and 13) with a portion, of the intermediate portion in the longitudinal direction of the second bus bar 22a, placed at the lower side of the relay case 16. The first bus bar 20a and the second bus bar 22a are placed distanced from each other. As shown in FIG. 13, the other end (right end of FIG. 13) of the first bus bar 20a is screw-combined to the cover upper member 62a along with an intermediate bus bar (not shown) at the other side in the width direction (upper side of FIG. 13) of the relay case 16. The other end (lower end of FIG. 13) of the second bus bar 22a is screw-combined to the cover upper member 62a at the one side in the width direction (lower side of FIG. 13) of the relay case 16, and is also connected to the inverter side connector terminal T5 (FIG. 1).

Further, as shown in FIGS. 12 and 14, on an upper surface of the cover lower member 61b which is a part of the device cover 60b, a first recess 74 and a second recess 75 which are partitioned by an electrically insulating wall 73 are formed. The electrically insulating wall 73 is a double wall, and is formed from two wall portions 73a and 73b. In correspondence to an L-shape gap 80 between the first bus bar 20a and the second bus bar 22a shown in FIG. 13, the wall portions 73a and 73b have an L shape viewed from above, and are formed aligned with a gap therebetween. With this structure, on the electrically insulating wall 73, a recess 73c at an intermediate portion in the width direction is formed over the entire length.

As shown in FIG. 12, the first inner heat conductive sheet 66 is placed at a lower end of the first recess 74. In addition, a flat plate shaped, intermediate portion in the longitudinal direction positioned at the lower end of the first bus bar 20a is overlapped and placed in the first recess 74 and at an upper side of the first inner heat conductive sheet 66. Similarly, the second inner heat conductive sheet 67 is placed at a lower end of the second recess 75, and a flat plate shaped, intermediate portion in the longitudinal direction positioned at a lower end of the second bus bar 22a is overlapped and placed in the second recess 75 and at an upper side of the second inner heat conductive sheet 67. As shown in FIG. 13, the first inner heat conductive sheet 66 has an L shape and the second inner heat conductive sheet 67 has a rectangular shape.

Further, at the lower side of the cover lower member 61b (FIG. 12), at positions overlapping the inner heat conductive sheet 66 and 67 as shown in FIG. 13 when viewed from one side in the up-and-down direction, one rectangular outer heat conductive sheet 65 is combined by adhesion.

According to the above-described configuration, the first inner heat conductive sheet 66 which contacts the first bus bar 20a at the lower side and the second inner heat conductive sheet 67 which contacts the second bus bar 22a at the lower side are placed separated in the first recess 74 and the second recess 75, partitioned by the electrically insulating wall 73. With this configuration, even when moisture enters inside the device cover 60b, or even when water vapor inside the device cover 60b condenses, and water is accumulated at the lower end of the device cover 60b, short-circuiting of the first bus bar 20a and the second bus bar 22a at the outer side of the relay can be prevented. Other structures and operations are similar to those of the structure of FIGS. 1 to 3, the structure of FIG. 4, or the structure of FIGS. 5 to 7.

In the configurations described above, a case is described in which the first bus bars 20a and 20b are electrically connected to the output terminal of the battery module 12, and the second bus bars 22a and 22b are electrically connected to the input terminal of the load. Alternatively, the first bus bar may be electrically connected to the input terminal of the load, and the second bus bar may be electrically connected to the output terminal of the battery. Further, in the configurations describe above, a case is described in which at least one bus bar of the first bus bars and the second bus bars is connected to the case lower member 41 of the battery case 40 in a manner to allow transfer of heat. Alternatively, the one bus bar may be connected in a manner to allow transfer of heat to the case upper member of the battery case. In this case, for example, the device cover has a structure in which the lower end is closed and an opening is formed at the upper end, and the one bus bar is connected to the case upper member via a heat conductive sheet in the device cover. In addition, in the structures of FIGS. 5 to 14, configurations are described in which the relay units 13, 13a, and 13b include the outer heat conductive sheet 65. Alternatively, the relay unit may have a structure which does not include the outer heat conductive sheet. For example, the outer heat conductive sheet may be provided at the relay unit side in the battery case.

REFERENCE SIGNS LIST

10 BATTERY RELAY CONNECTION STRUCTURE FOR EQUIPMENT ON VEHICLE (BATTERY RELAY CONNECTION STRUCTURE); 12 BATTERY MODULE; 13, 13a, 13b RELAY UNIT; 14 POSITIVE ELECTRODE RELAY; 15 NEGATIVE ELECTRODE RELAY; 16 RELAY CASE; 20a, 20b FIRST BUS BAR; 21 PROJECTION; 22a, 22b SECOND BUS BAR; 30 DEVICE COVER; 31 FLANGE; 32 BOLT; 33 NUT; 34 TOP PLATE PORTION; 35 PROTRUSION; 35a BUS BAR RETAINING HOOK; 46 HEAT CONDUCTIVE SHEET; 37 HEAT CONDUCTIVE SHEET; 38, 38a COVER. LOWER MEMBER; 39 SECOND HEAT CONDUCTIVE SHEET; 40, 40a, 40b BATTERY CASE; 41, 41a, 41b CASE LOWER MEMBER; 42 BOTTOM PLATE PORTION; 43 OUTER CIRCUMFERENTIAL WALL PORTION; 45, 45a CASE UPPER MEMBER; 46 TOP PLATE PORTION; 47 OUTER CIRCUMFERENTIAL WALL PORTION; 48 HEAT INSULATION MEMBER; 49 HEAT CONDUCTIVE MEMBER; 50 INVERTER; 51 OUTER CIRCUMFERENTIAL WALL; 52 RECESS; 53 PROJECTION; 60, 60a, 60b DEVICE COVER; 61, 61a, 61b COVER LOWER MEMBER; 62, 62a COVER UPPER MEMBER; 63 TOP PLATE PORTION; 65 OUTER HEAT CONDUCTIVE SHEET; 66 FIRST INNER HEAT CONDUCTIVE SHEET; 67 SECOND INNER HEAT CONDUCTIVE SHEET; 70 SHEET PROTECTION WALL; 71 NOTCH; 72 BOLT; 73 ELECTRICALLY INSULATING WALL; 73a, 73b WALL PORTION; 73c RECESS; 74 FIRST RECESS; 75 SECOND RECESS; 80 GAP.

The invention claimed is:

1. A relay unit housed in a battery case, the relay unit comprising:

a first bus bar;

a relay that is electrically connected to the first bus bar; and a device cover that covers the first bus bar and the relay, wherein the device cover includes an upper member which has a box shape with an upper end closed and with an opening formed at a lower end, and a lower member which is combined with the upper member in a manner to close the opening of the upper member, the lower member is formed from a resin having a higher heat conductive property than the upper member, the first bus bar is connected to the lower member in a manner to allow transfer of heat, via a first inner heat conductive sheet placed between the first bus bar and the lower member, the first inner heat conductive sheet is an electrically insulating resin sheet having a lower surface hardness than the lower member, the relay unit further comprises an outer heat conductive sheet that is placed at a lower surface of the lower member, the first bus bar is connected to the outer heat conductive sheet in a manner to allow the transfer of heat, via the first inner heat conductive sheet and the lower member, the relay unit further comprises a second bus bar that is covered by the device cover, wherein the relay is electrically connected to each of the first bus bar and the second bus bar, between the first bus bar and the second bus bar, a first recess and a second recess which are partitioned by an electrically insulating wall are formed on an upper surface of the lower member, the first inner heat conductive sheet is placed in the first recess and the first bus bar is placed in an overlapping manner at an upper side of the first inner heat conductive sheet in the first recess, a second inner heat conductive sheet is placed in the second recess and the second bus bar is placed in an overlapping manner at an upper side of the second inner heat conductive sheet in the second recess, and the second bus bar is connected to the outer heat conductive sheet in a manner to allow transfer of heat, via the second inner heat conductive sheet and the lower member.

2. A relay unit housed in a battery case, the relay unit comprising:

a first bus bar;

a relay that is electrically connected to the first bus bar; and a device cover that covers the first bus bar and the relay, wherein the device cover includes an upper member which has a box shape with an upper end closed and with an opening formed at a lower end, and a lower member which is combined with the upper member in a manner to close the opening of the upper member, the lower member is formed from a resin having a higher heat conductive property than the upper member, the first bus bar is connected to the lower member in a manner to allow transfer of heat, via a first inner heat conductive sheet placed between the first bus bar and the lower member, the first inner heat conductive sheet is an electrically insulating resin sheet having a lower surface hardness than the lower member, the relay unit further comprises an outer heat conductive sheet that is placed at a lower surface of the lower member, the first bus bar is connected to the outer heat conductive sheet in a manner to allow the transfer of heat, via the first inner heat conductive sheet and the lower member, the outer heat conductive sheet is adhered to the lower surface of the lower member, a sheet protection wall which protrudes to a lower side is formed on a portion, of the lower surface of the lower member, opposing at least a part of an outer circumferential surface of the outer heat conductive sheet, and a notch is formed on the sheet protection wall on an outer circumferential surface including a lower end of the outer heat conductive sheet, to expose a portion in a circumferential direction.

\* \* \* \* \*